(12) United States Patent
    Oppenheimer (10) Patent No.: US 12,250,307 B2
(45) Date of Patent: Mar. 11, 2025

(54) METHOD FOR SECURELY MAINTAINING AN ENCRYPTION KEY

(71) Applicant: Enveloc, Inc., Mobile, AL (US)

(72) Inventor: William W. Oppenheimer, Mobile, AL (US)

(73) Assignee: Enveloc, Inc., Mobile, AL (US)

( * ) Notice: Subject to any disclaimer, the term of this patent is extended or adjusted under 35 U.S.C. 154(b) by 1326 days.

(21) Appl. No.: 16/435,831

(22) Filed: Jun. 10, 2019

(65) Prior Publication Data

US 2019/0379539 A1    Dec. 12, 2019

Related U.S. Application Data

(60) Provisional application No. 62/682,281, filed on Jun. 8, 2018.

(51) Int. Cl.
    *H04L 29/06* (2006.01)
    *H04L 9/06* (2006.01)
    *H04L 9/08* (2006.01)
    *H04L 51/48* (2022.01)

(52) U.S. Cl.
    CPC .......... *H04L 9/0894* (2013.01); *H04L 9/0625* (2013.01); *H04L 51/48* (2022.05)

(58) Field of Classification Search
    CPC ...... H04L 9/0894; H04L 9/0625; H04L 51/28
    See application file for complete search history.

(56) References Cited

U.S. PATENT DOCUMENTS

2013/0013931 A1*   1/2013   O'Hare ................... H04L 9/085
                                                           713/189

* cited by examiner

*Primary Examiner* — Wasika Nipa
(74) *Attorney, Agent, or Firm* — Leydig, Voit & Mayer, Ltd.

(57) ABSTRACT

A method and system are described for storing and retrieving an encrypted master encryption key at multiple distinct physical servers in such a way as to prevent discovery of the master encryption key by any single one of the multiple holders. A retrieval mechanism is provided that facilitates a simple retrieval of the multiple pieces of the master encryption key from the multiple holders. The described system utilizes a combination of encryption algorithms, data storage, and transmission methods to carry out the new way of retrieving and storing the master encryption key.

21 Claims, 6 Drawing Sheets

METHOD FOR SECURELY MAINTAINING AN ENCRYPTION KEY

CROSS-REFERENCE TO RELATED APPLICATIONS

This application is a non-provisional of U.S. Provisional Application Ser. No. 62/682,281, filed Jun. 8, 2018, entitled "SECURE STORAGE AND RETRIEVAL OF ENCRYPTION KEY," the contents of which are expressly incorporated herein by reference in their entirety, including any references therein.

FIELD OF THE INVENTION

The present disclosure generally relates to encryption technologies. More particularly, the disclosure relates to securely maintaining a small digital data asset (e.g. less than a 10 kilobytes). Even more particularly, the present disclosure relates to a procedure for safeguarding a personalized encryption key used to encrypt data in an electronic computing system.

BACKGROUND

As personal information and other sensitive digital data assets are shifted to the cloud, there is an increasing need to securely encrypt computer data. This reliance on encryption, in turn, creates user demand for immediate access to an encryption key that a user may reliably employ to perform a cryptographic operation on the data of interest. Access to such personalized encryption keys is desirable, for example, when creating and maintaining a cloud-based backup of data files from a user device (e.g. computer, mobile device, etc.). A personalized encryption key enables a user to ensure that only the user is able to gain access, in a meaningful way, to an encrypted copy of the user's cloud-based copy of backed-up data.

A variety of secure cloud-based backup services exist to meet such user needs. Important characteristics of cloud-based backup systems providing secure backup services include: offsite storage to protect against major disasters such as fire or flood, secure encryption to safeguard confidentiality, and immediate access to provide prompt return to operation. In such backup systems, the user creates a unique, secret key which is used to create an encrypted copy of the backup copy of the data prior to transferring the backup copy to the backup facility (or facilities). The encrypted backup copy of the data is thereafter transmitted to an offsite electronic data storage facility. Ideally the encrypted backup copy is stored at a facility geographically distant from the user (protection against a disaster). The user's personalized encryption key should not be stored with the user's data, since anyone with access to the data storage facility will have access to the data. However, for the same reasons the encrypted data backup is stored offsite, so too should the user's personalized encryption key. Additionally, the encryption key needs to be immediately accessible so that when the user needs to retrieve and decrypt the encrypted backup copy of the data, the personalized encryption key will be available with little or no delay or inconvenience to the user of the secure backup service.

The use of a personalized key presents its own set of challenges and potential pitfalls—circumstances that present significant concerns that may ultimately cause a user (a natural person or a legal entity such as a corporation) to not rely upon a personalized encryption key. A corporate user of the secure backup service may operate as the successor to an original user that created the encrypted backup copy. However, due to oversight during the legal succession process, the personalized key (potentially a sequence of alphanumeric characters on a physical sheet of paper) was not transferred to the corporate successor. Another potentially disastrous situation may arise in a case where the personalized encryption key is placed on a physical paper that is subsequently misfiled or otherwise lost. A personalized encryption key may be lost in any of a number of ways, including for example, a breakdown of a computer containing both the original copy of the personalized encryption key and the backed up data. In which case, both the data and the encryption key are no longer available.

SUMMARY OF THE INVENTION

An automated secure data storage/retrieval system is described herein that supports a secure maintenance yet easy user access to a personalized encryption key used to encrypt an electronic data asset, such as for example a cloud backup of data stored on a user computer. In particular, a method and system are described for securely remotely storing an encryption key. The method includes encrypting the encryption key using a symmetrical encryption algorithm to render a cipher text data. Thereafter, an operation is performed for splitting, using according to a splitting algorithm, the cipher text data into at least a first cipher text segment set and a second cipher text segment set. Thereafter, a further operation is performed for transferring the first cipher text segment set and the second cipher text segment set, respectively, to a first storage server at a first geographic location and a second storage server at a second geographic location of a secure storage system. In association with the transferring, an identifying value is provided for subsequent identification of the first cipher text segment set and the second cipher text segment set from the secure storage system.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Figure 6:
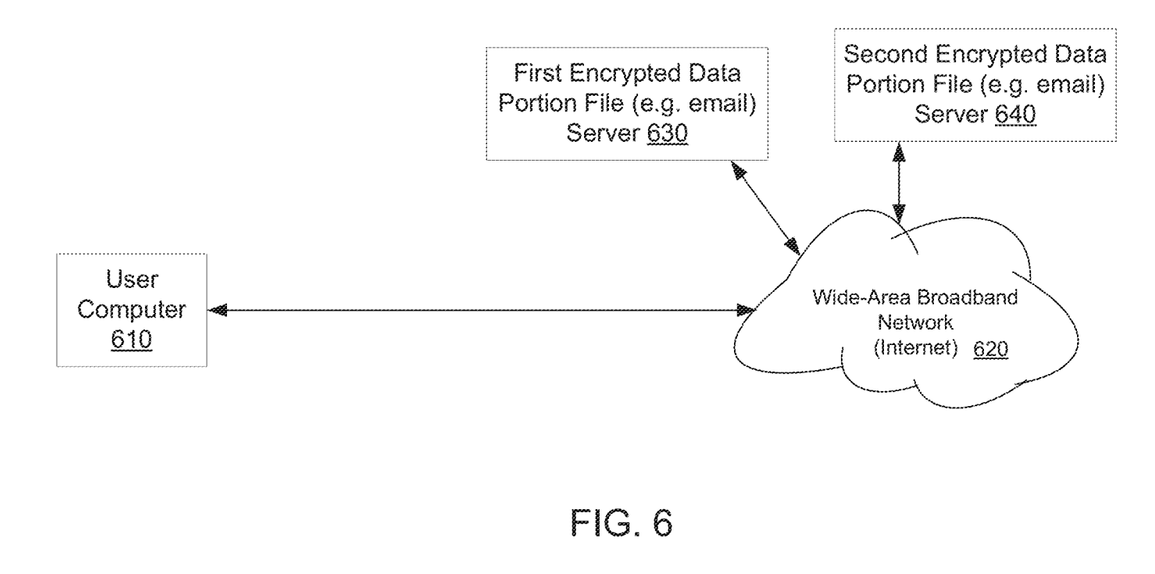
FIG. 6 is a schematic block diagram of an exemplary system arrangement for carrying out an illustrative example of the invention.

In the description of a procedure and system herein, an automated secure data storage/retrieval system is described that supports a secure maintenance, yet easy user access, to a personalized encryption key used to encrypt an electronic data asset, such as for example a cloud backup of data stored on a user computer 610 (see FIG. 6). The disclosed system and operation thereof provides for acquisition/identification of a personalized encryption key (also referred to herein as a "master encryption key") for a user to encrypt and store. Advantageously, the master encryption key is maintained (in an encrypted and split form) without a need for the user to know the actual content (i.e. bit/byte values) of the master encryption key or even a password. Through encryption and splitting operations described herein, the content value of the master encryption key bit/byte string is protected during transit to/from at least two geographically distinct remote storage locations. As such, the described procedures and system address security, accessibility, and convenience concerns relating to other utilized approaches to maintaining personalized encryption keys that are used to encrypt digital data assets, such as cloud-based data backups for business concerns and individual users.

Figure 1:
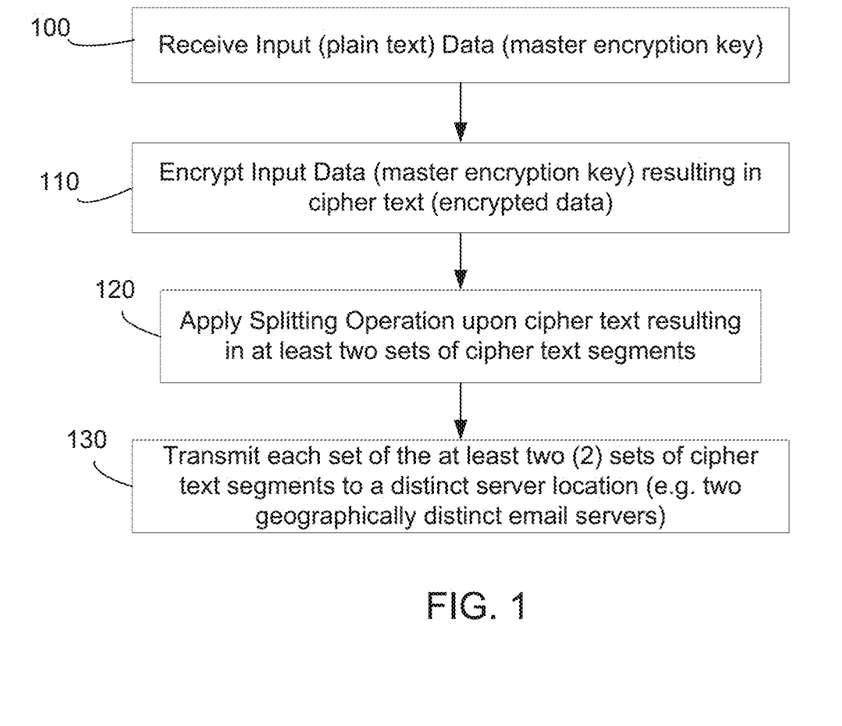
FIG. 1 is a flow diagram summarizing operations of a method for maintaining a personalized encryption key including splitting the personalized encryption key into at least two sets of cipher text data segments that are thereafter transferred to at least two distinct locations for storing and rapid retrieval in accordance with an illustrative example.

Turning to FIG. 1, a storing part of the disclosed method is described wherein a master encryption key is encrypted, split (into at least two portions), and the resulting (at least two) individual portions are stored at two or more distinct locations. By way of example, the operations summarized in FIG. 1 are carried out by an application running on the user computer 610 (see FIG. 6). After installing the application on the user computer 610, the application is invoked, and a user identifies an input data via an interface input control (e.g. input field box). In the illustrative example, the input data is a plain text master encryption key used to encrypt a backup of a digital data asset that is to be stored on a cloud-based backup server. The user also specifies a name/identification to be attached to subsequently generate encrypted data files associated with the process summarized in FIG. 1. Additional identification information (See FIG. 5) included in a subsequently generated/transmitted email containing a part of an encrypted form of the master encryption key may also be provided by the user via interface input controls (input boxes).

An email transfer mode is described in the illustrative example. However, alternative transfer modes may be used, such as an internet page incorporating secure file transfer protocol (FTP). In such case, the user is provided a unique receipt upon completion of successful transfer of the at least two parts of the encrypted master encryption key in cipher text form. The unique receipt operates as the primary identifier in a request to retrieve a copy of the encrypted parts maintained on remote file servers by the system.

During 100, the system receives an input data (e.g. the master encryption key in the form of plaintext data). The input data may be in a readable format. In the illustrative example, the input data is the master encryption key. The master encryption key is relatively small (e.g. anywhere from a few characters/bytes to a few thousand characters/bytes).

Thereafter, during 110, the system applies an encryption algorithm (e.g. AES encryption) to the master encryption key to render a cipher text data. During the encryption performed at 110 the encryption routine and key are known such that a decryption may be performed at a later time (to render the master encryption key) by invoking a complementary decryption operation on the cipher text data at 320 of FIG. 3 (described herein below). In the illustrative example, the encryption key used to render the cipher text during 110 is any set of characters and need not be secret. In fact it is known and transferred with each of at least two cipher text segment sets during step 130 discussed herein below. The operation of encrypting input data to render cipher text is well known to those familiar with the art. By way of example, during 110, a chaining block cipher such as AES or 3DES is executed, on the input data, utilizing blocks of 8 bytes. Control then passes to 120.

During 120, a splitting operation (see e.g., FIG. 2) is performed on the cipher text data of step 110 to render at least two (2) sets of cipher text segments. The general goal of operation 120 is to split an input bit/byte sequence (i.e. the cipher text data rendered during 110) into at least two sets of cipher text segments that are: (1) not easily recognized, and (2) relatively easily reassembled, on demand, to render the original cipher text data. The splitting operation is discussed herein below with reference to a particular example in FIG. 2. The output of operation 120 comprises at least two distinct data structures (e.g. files) that are labeled accordingly (e.g., Set A, Set B) to facilitate subsequent transmission, during operation 130 to a respective remote storage location.

With continued reference to FIG. 1, during 130 each of the at least two sets of cipher text segments is transmitted to a pre-designated remote storage location (e.g. a first portion file server 630 and a second portion file server 640—email file servers). In an illustrative example, the cipher text is split into two cipher text sets. Each of the two cipher text segment sets is emailed to a pre-designated one of the two (email) file server destinations affiliated with either the first or the second set of cipher text segments. However, transfer of the two cipher text segment sets could be by any means: on physical media, through telephone lines using modems, or across computer networks such as via the internet 620. During 130, the transfer process across the internet 620 can employ secure transmission protocols such as SSL or SSH. It may also use simple, unsecured methods such as ordinary email.

Regardless of the transfer mode, each one of the at least two sets of cipher text segments is accompanied by a copy of the system key that was used during 110 to render the cipher text from the input data. Sufficient additional identifying information accompanies each transmitted set of cipher text segments to facilitate retrieval and return upon demand from a user (see, FIG. 3 "retrieval/reassembly" process described herein below). There is no special requirements for the storage facilities that receive each of the at least two sets of cipher text segments. However, the storage facilities may be unrelated (i.e. geographically distinct, autonomously managed/operated, etc.). The autonomy is intended to ensure that, under no circumstance, is any party (other than the original/requesting user) able to gain access to each one of the at least two cipher text segments. Geographically remote destinations for each of the servers 630 and 640 is preferable to ensure an absence of simultaneous physical access by a person to both of the servers containing the respective parts of the at least two cipher text segment sets.

The system maintains each one of the at least two cipher text segment sets ready for return on demand. The storage at each server location may be backed up by the storage facility inasmuch as the at least two cipher text segment sets may be the only copy of the master encryption key.

Figure 2:
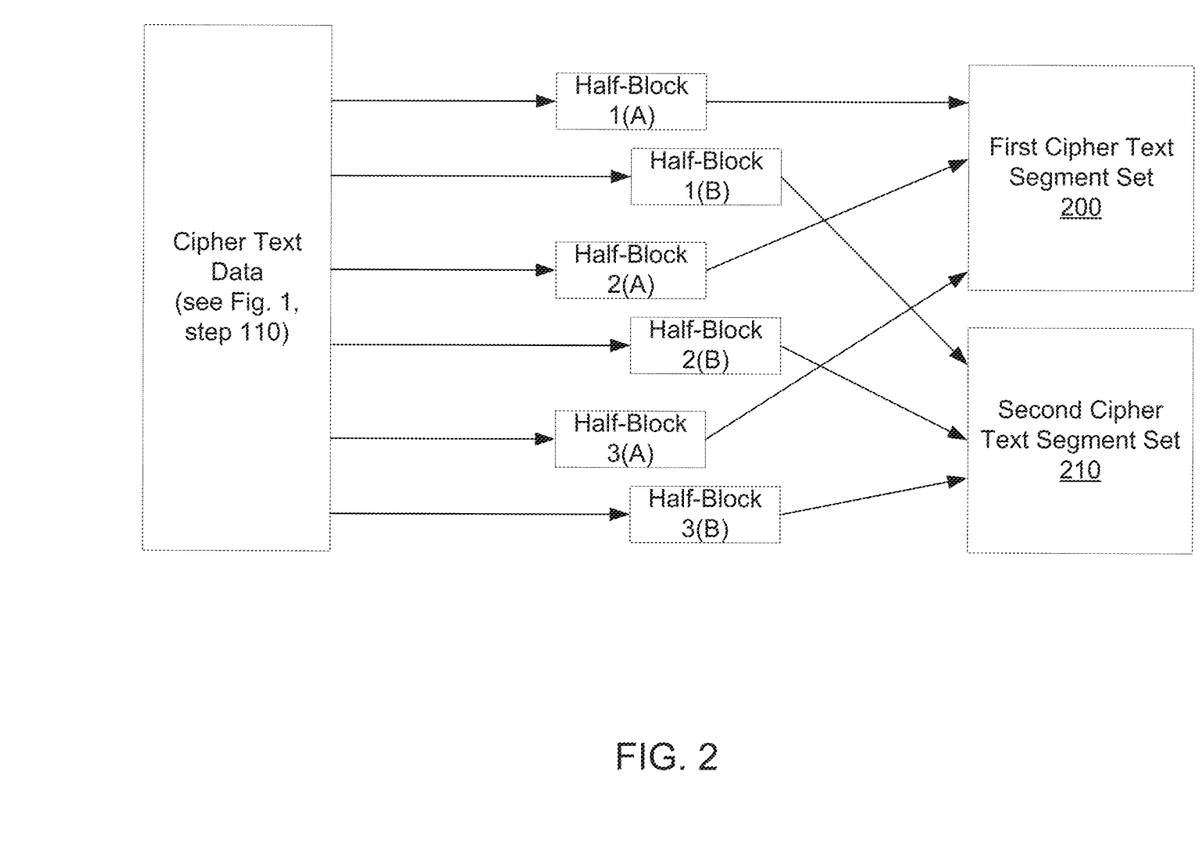
FIG. 2 is a schematic diagram depicting the splitting of the cipher text data into the two sets of cipher text data segments for storing at two distinct localities in accordance with an illustrative example.

The details of an illustrative example of the splitting the cipher text data into the at least two cipher text segment sets are illustrated in FIG. 2. In the illustrative example, the electronic computing system reads the cipher text data rendered during 110 from beginning to end. In the illustrative example, the cryptographic algorithm applied during 110 is configured to encrypt the input data in blocks of 8 bytes. The splitting operation carried out during 120 alternatingly designates split parts of three (3) 8-byte blocks of the cipher text data using half-blocks, which are 4 bytes long, to respective first and second sets of cipher text segments. In the illustrative example, each one of the three 8-byte blocks is split into a first 4-byte segment (A) and a second 4-byte segment (B). Thus, upon completion of 120, a first set of cipher text segments 200 contains all the (A) segments (e.g. a first set containing three 4-byte segments), and a second set of cipher text segments 210 contains all the (B) segments (e.g. a second set containing three 4-byte segments) of the original set of three 8-byte blocks of the cipher text data. In the illustrative example, the relative order of the 4-byte segments is maintained when assembled in the first set of cipher text segments 200 and the second set of cipher text segments 210 (i.e. the 4-byte segments are ordered according to the relative positions of their corresponding 8-byte blocks). This arrangement is merely exemplary in nature and other manners of performing the splitting operation during 120 are contemplated in other alternative embodiments.

Figure 3:
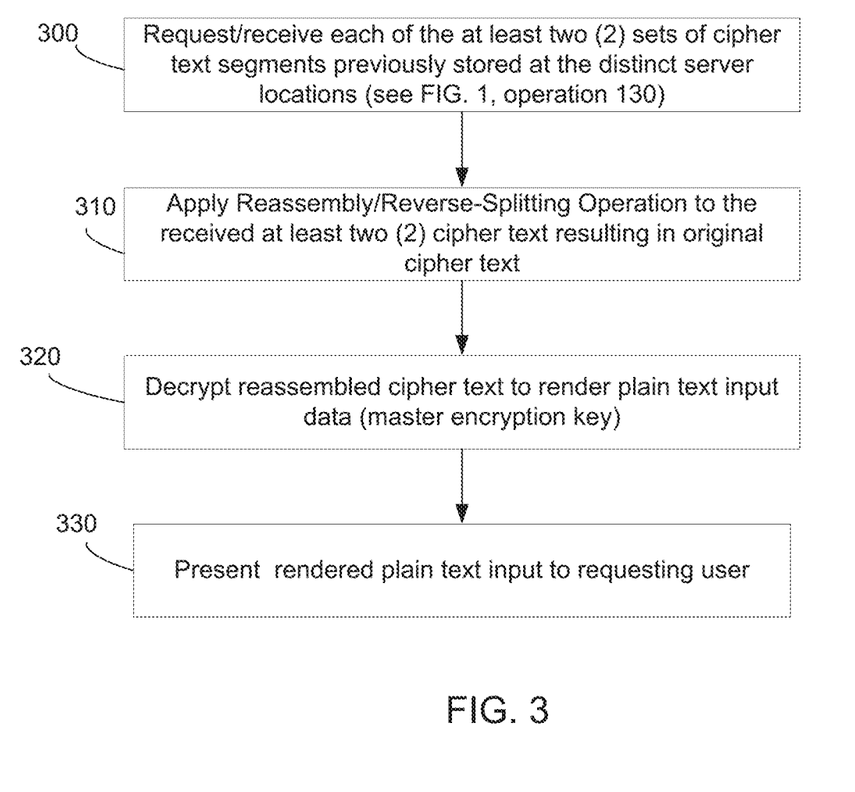
FIG. 3 is a flow diagram summarizing operations of a method for rendering the personalized encryption key from the two sets of cipher text data segments stored at two distinct localities in accordance with an illustrative example.

Having described an exemplary set of operations involved in creating and sending the first set of cipher text segments 200 containing an ordered set of (A) segments and the second set of cipher text segments 210 contains an ordered set of the (B) segments of the original set of blocks of the cipher text data, attention is directed to FIG. 3 that summarizes operations associated with a corresponding process for retrieving and processing the remotely stored first set 200 and second set 210 to render the input data set (e.g. the master encryption key) initially received during 100 of the operations summarized in FIG. 1.

Turning to FIG. 3, during 300 a user (via a computer) issues a request to an administrator requesting a copy of each of the first set of cipher text segments 200 and the second set of cipher text segments 210 of the original cipher text data. By way of example, the user posts a single request to a system administrator (e.g. an electronic message from a user to administrative computer, a verbal request over a phone, etc.). The single request, including appropriate unique identifier of the previously split/stored cipher text segment sets, is converted to file retrieval commands submitted to each of the servers that currently store the sets of cipher text segments. In the illustrative example, an initial request is submitted to a first server (e.g. server 630), and the first server responds to the request by both: (1) retrieving/returning a first set of cipher text segments stored on the server, and (2) issuing a request to another server (e.g. server 640) that processes the relayed request by retrieving/returning a second set of cipher text segments. The above example is merely illustrative, for the case where each one of at least two distinct storage facilities (see e.g., FIG. 6, Server 630 and server 640) storing the at least two cipher text segment sets rendered and stored during the process summarized in FIG. 1. Other ways of retrieving/returning previously stored sets of cipher text segments are contemplated. Thus, in the illustrative example, in response to the user requests, the server 630 and the server 640 return their respective first set 200 and second set 210 of cipher text segments. Additionally, the previously provided system key (used to render the original cipher text) is returned to the requesting user in accordance with the illustrative example.

In the illustrative example, the first and second sets of cipher text segments are returned, by requirement, to an email address of record. In an extreme situation, such as the email address of record is closed or otherwise inaccessible by the entity of record, an alternative delivery mode is used that ensures that only an authorized entity receives the first/second sets of cipher text segments.

During 310, a cipher text reassembly operation is performed by a utility executing at the user computer 610. The reassembly operation, described by way of an illustrative example with reference to FIG. 4 herein below, reverses the splitting operation performed on the original cipher text during 120 described with reference to FIG. 1 herein above. The reassembly operation performed during 310 results in the original cipher text previously rendered during 110 described above with reference to FIG. 1.

During 320, a decryption operation is performed on the reassembled cipher text. During 320, the decryption applies the system key returned with the first/second cipher text segment sets 200 and 210 during 300 to the requesting user. The operations carried out during 320 result in the original input data (e.g. the master encryption key) for use by the user to perform a decryption operation on, for example, a backup copy of a digital data asset previously stored on a cloud-based backup server.

Figure 4:
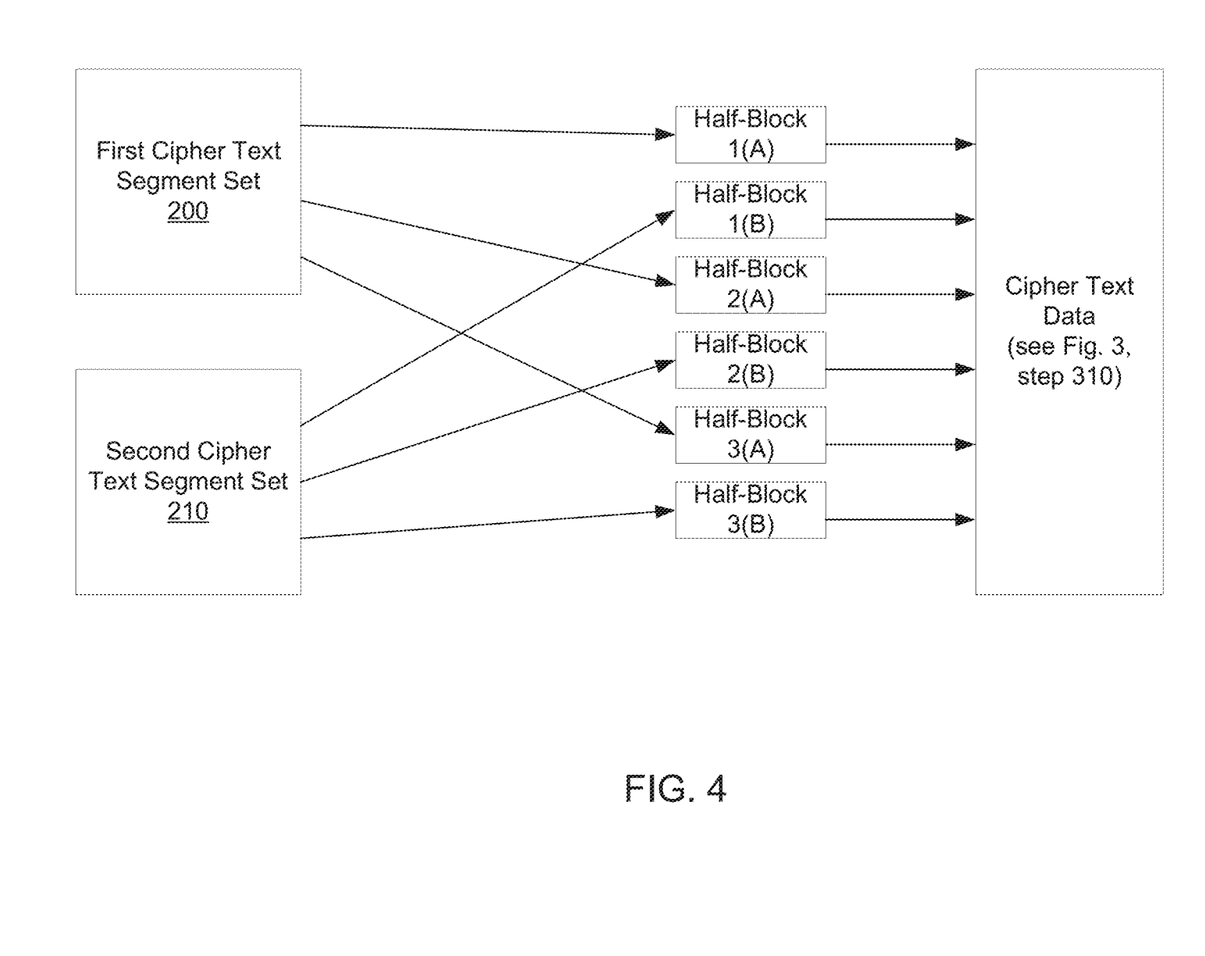
FIG. 4 is a schematic diagram depicting the reassembly of the two sets of cipher text data segments to render the cipher text data in accordance with an illustrative example.

Turning to FIG. 4, an illustrative complementary reassembly operation (to the splitting operation depicted in FIG. 2) is schematically depicted. The reassembly process sequentially rejoins the 4-byte (A)/(B) segments of each one of the three (3) 8-byte blocks of cipher text separately stored as the first set of cipher text segments 200 and the second set of cipher text segments 210. In particular, the respective 4-byte (A) and (B) blocks for each of the three 8-byte blocks of the original cipher text are paired and joined to form the three block, 24-byte, sequence of the original cipher text. In the illustrative example, the three (3) (A) portions taken from the first cipher text segment set 200 are rejoined with the corresponding (B) portions taken from the second cipher text segment set 210 to render the three original 8-byte blocks of cipher text generated during the encryption step 110. As shown in FIG. 4, the half blocks are interleaved until the entire string of cipher text has been reconstructed. At which point, the system may perform the decryption operation (operation 320) to render the original input data (e.g. master encryption key).

Notably, the encryption process (rendering cipher text) splitting (rendering at least two sets of cipher text segments) process, assembly (undoing the splitting) and decryption process (undoing the encryption) all take place at the user computer 610. This means that each split part cannot be read as plaintext by an adversary "sniffing" the internet or by a hacker penetrating a storage facility.

Figure 5:
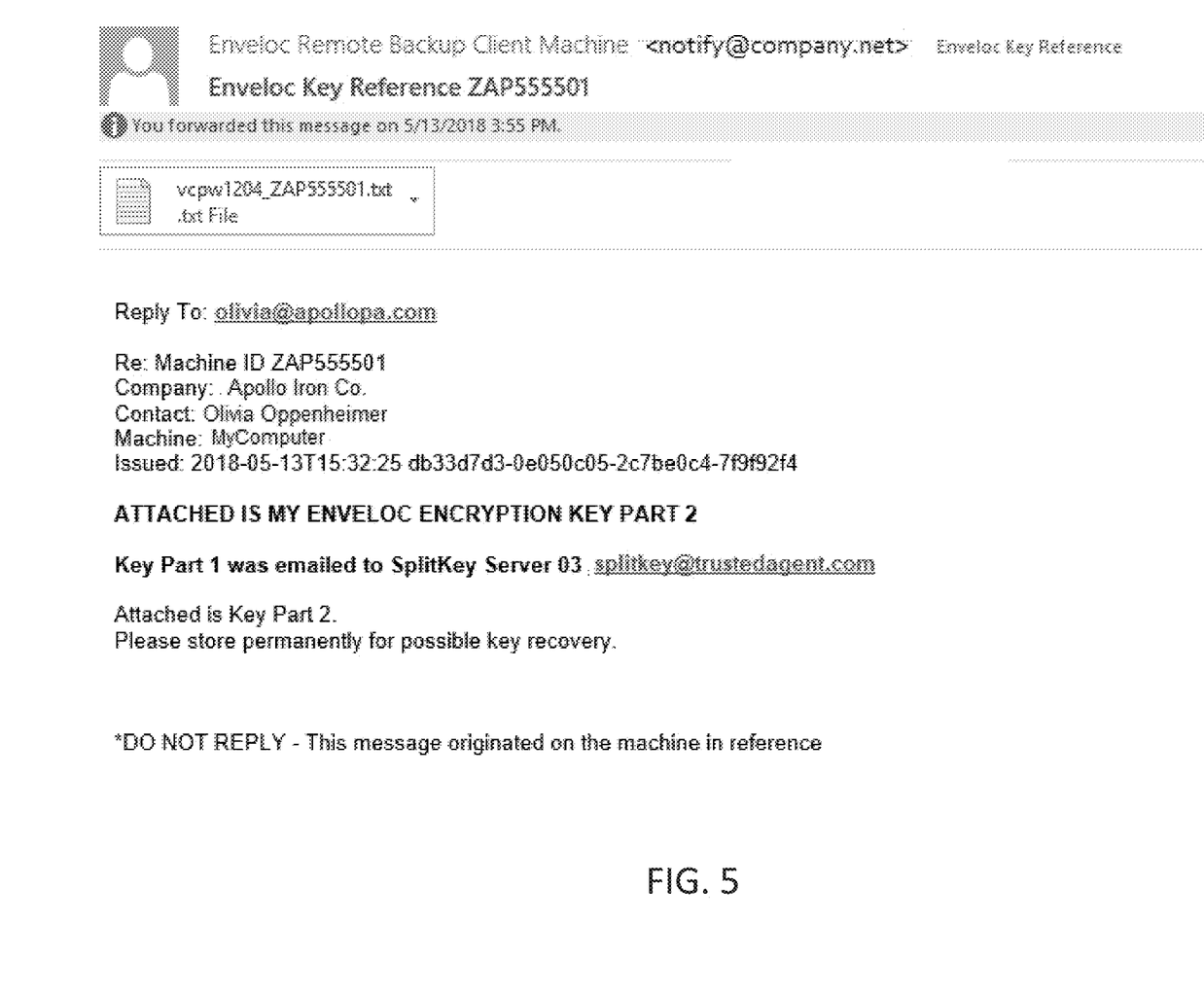
FIG. 5 is an exemplary email message format used to transfer a set of cipher text segments to one of two dedicated remote storage facilities.

Turning to FIG. 5, an exemplary email format is depicted that is used, in the illustrative example, to send one of the at least two sets of cipher text segments 200 and 210. In the illustrative example, the second set 210 has been attached as a .txt file. The exemplary email-based transfer method further includes a "Reply to" field identifying an email address associated with the owner of the master encryption key (owner of record) associated with the provided second set 210.

The email message field includes: a machine identification, a company affiliation, a contact name, a machine name, a time stamp and the encryption key used to convert the plain text master encryption key into cipher text (stored in two parts on the remote servers).

A subject field of the email message identifies an account of the user associated with the submitted second cipher text segment set 210. In the illustrative example, the account also serves as the identifier provided when the account owner wishes to retrieve the sets of cipher text segments from the system servers.

The email message further includes a location of the first cipher text segment set 200 (or further listed destinations in the event that more than two segment sets are created.

In closing, with regard to FIG. 5, it is emphasized that this is merely an example and other modes of transferring the sets of cipher text segments are contemplated in alternative embodiments.

In the illustrative embodiment, the first segment set 200 and the second segment set 210 are transmitted by ordinary email to email file server computers. The email is composed and transmitted automatically by an application resident on the user computer 610. As shown in FIG. 5, the email provides a return address, and the file containing the segment set is attached to the email. The remote storage facility utilizes a server computer that automatically checks for received email every few minutes. When a received email meets certain predetermined characteristics, the storage facility records the event and maintains the email message and attachment in a pre-configured storage location in a directory structure maintained by the email file server system.

When the user wishes to request return of the split key parts, an email message is sent from the user's machine to one of the storage facilities, which then notifies the other storage facility of the request. Each then attaches the respective split key part to the email address designated as the return address of the user. When the user computer 610 receives the two split parts, the assembly process is initiated and the plaintext key used to encrypt the original master encryption key (resulting in the cipher text version stored in at least two parts at the remote servers) is recovered.

It will be appreciated that the foregoing description relates to examples that illustrate a preferred configuration of the cleaning system. However, it is contemplated that other implementations of the invention may differ in detail from foregoing examples. As noted earlier, all references to the invention are intended to reference the particular example of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for securely remotely storing an encryption key, the method comprising:
   encrypting the encryption key using a symmetrical encryption algorithm to render a cipher text data;
   splitting, using according to a splitting algorithm, the cipher text data into at least a first cipher text segment set and a second cipher text segment set; and
   transferring the first cipher text segment set and the second cipher text segment set, respectively, to a first storage server at a first geographic location and a second storage server at a second geographic location of a secure storage system,
   wherein, in association with the transferring, an identifying value is provided for subsequent identification of the first cipher text segment set and the second cipher text segment set from the secure storage system.

2. The method of claim 1 further comprising:
   transferring a symmetric key, used during the encrypting, in association with the transferring the first cipher text segment set and the second cipher text segment set.

3. The method of claim 1 wherein the transferring the first cipher text segment set and the second cipher text segment set is carried out by an email protocol transfer.

4. The method of claim 3 wherein, during the transferring the first cipher text segment set and the second cipher text segment set, an email address of record accompanies at least a first email message containing the first cipher text segment set,
   where the email address of record operates as a destination for returning the first cipher text segment set and the second cipher text segment set from the secure storage system.

5. The method of claim 3 wherein, during the transferring the first cipher text segment set and the second cipher text segment set, an identification of the second server accompanies at least a first email message containing the first cipher text segment set.

6. The method of claim 5, where the identification of the second server operates as a destination for the first server relaying a received request to return the second cipher text segment set from the secure storage system.

7. The method of claim 1, wherein during the splitting, the cipher text data is split into at least the first cipher text segment set and the second cipher text segment set by alternatingly assigning equal-size blocks to the first cipher text segment set and the second cipher text segment set.

8. A non-transitory computer readable medium including computer-executable instructions facilitating performing, on a computer system, a method for securely remotely storing an encryption key, the method comprising:

encrypting the encryption key using a symmetrical encryption algorithm to render a cipher text data;

splitting, using according to a splitting algorithm, the cipher text data into at least a first cipher text segment set and a second cipher text segment set; and transferring the first cipher text segment set and the second cipher text segment set, respectively, to a first storage server at a first geographic location and a second storage server at a second geographic location of a secure storage system, wherein, in association with the transferring, an identifying value is provided for subsequent identification of the first cipher text segment set and the second cipher text segment set from the secure storage system.

9. The non-transitory computer readable medium of claim 8 further comprising computer-executable instructions for:

transferring a symmetric key, used during the encrypting, in association with the transferring the first cipher text segment set and the second cipher text segment set.

10. The non-transitory computer readable medium of claim 8 wherein the transferring the first cipher text segment set and the second cipher text segment set is carried out by an email protocol transfer.

11. The non-transitory computer readable medium of claim 10 wherein, during the transferring the first cipher text segment set and the second cipher text segment set, an email address of record accompanies at least a first email message containing the first cipher text segment set, where the email address of record operates as a destination for returning the first cipher text segment set and the second cipher text segment set from the secure storage system.

12. The non-transitory computer readable medium of claim 10 wherein, during the transferring the first cipher text segment set and the second cipher text segment set, an identification of the second server accompanies at least a first email message containing the first cipher text segment set.

13. The non-transitory computer readable medium of claim 12, where the identification of the second server operates as a destination for the first server relaying a received request to return the second cipher text segment set from the secure storage system.

14. The non-transitory computer readable medium of claim 8, wherein during the splitting, the cipher text data is split into at least the first cipher text segment set and the second cipher text segment set by alternatingly assigning equal-size blocks to the first cipher text segment set and the second cipher text segment set.

15. A computer system including:

a processor; and a non-transitory computer readable medium including computer-executable instructions that, when executed on the processor, facilitate performing, on the computer system, a method for securely remotely storing an encryption key, the method comprising:

encrypting the encryption key using a symmetrical encryption algorithm to render a cipher text data;

splitting, using according to a splitting algorithm, the cipher text data into at least a first cipher text segment set and a second cipher text segment set; and transferring the first cipher text segment set and the second cipher text segment set, respectively, to a first storage server at a first geographic location and a second storage server at a second geographic location of a secure storage system, wherein, in association with the transferring, an identifying value is provided for subsequent identification of the first cipher text segment set and the second cipher text segment set from the secure storage system.

16. The system of claim 15, wherein the non-transitory computer readable medium further comprises computer-executable instructions for:

transferring a symmetric key, used during the encrypting, in association with the transferring the first cipher text segment set and the second cipher text segment set.

17. The system of claim 15 wherein the transferring the first cipher text segment set and the second cipher text segment set is carried out by an email protocol transfer.

18. The system of claim 17 wherein, during the transferring the first cipher text segment set and the second cipher text segment set, an email address of record accompanies at least a first email message containing the first cipher text segment set, where the email address of record operates as a destination for returning the first cipher text segment set and the second cipher text segment set from the secure storage system.

19. The system of claim 17 wherein, during the transferring the first cipher text segment set and the second cipher text segment set, an identification of the second server accompanies at least a first email message containing the first cipher text segment set.

20. The system of claim 19, where the identification of the second server operates as a destination for the first server relaying a received request to return the second cipher text segment set from the secure storage system.

21. The system of claim 15, wherein during the splitting, the cipher text data is split into at least the first cipher text segment set and the second cipher text segment set by alternatingly assigning equal-size blocks to the first cipher text segment set and the second cipher text segment set.

* * * * *